(12) United States Patent
Contreras et al.

(10) Patent No.: US 8,081,399 B2
(45) Date of Patent: Dec. 20, 2011

(54) PERPENDICULAR MAGNETIC RECORDING WRITE HEAD WITH ENHANCEMENT CAPACITOR ON SLIDER BODY FOR WRITE CURRENT OVERSHOOT AT WRITE CURRENT SWITCHING

(75) Inventors: John Thomas Contreras, Palo Alto, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 264 days.

(21) Appl. No.: 12/615,087

(22) Filed: Nov. 9, 2009

(65) Prior Publication Data

US 2011/0109993 A1 May 12, 2011

(51) Int. Cl.
    *G11B 5/60* (2006.01)
(52) U.S. Cl. ........................ 360/234.4; 360/46
(58) Field of Classification Search ............ 360/123.06, 360/123.1, 123.36, 123.57, 245.8, 46, 234.4
    See application file for complete search history.

(56) References Cited

U.S. PATENT DOCUMENTS

| | | | | |
|---|---|---|---|---|
| 5,712,747 A * | 1/1998 | Voldman et al. | ........... | 360/234.4 |
| 5,978,181 A * | 11/1999 | Niijima et al. | ........... | 360/323 |
| 6,028,748 A * | 2/2000 | Kuroe et al. | ........... | 360/110 |
| 6,331,919 B1 * | 12/2001 | Klaassen et al. | ........... | 360/46 |
| 6,404,575 B1 * | 6/2002 | Yen | ........... | 360/46 |
| 6,603,623 B1 | 8/2003 | Fontana, Jr. et al. | | |
| 6,972,916 B1 * | 12/2005 | Aram et al. | ........... | 360/46 |
| 7,054,085 B2 * | 5/2006 | Lin et al. | ........... | 360/46 |
| 7,359,149 B2 * | 4/2008 | Kiyono et al. | ........... | 360/125.33 |
| 7,394,605 B2 * | 7/2008 | Amemiya | ........... | 360/46 |
| 7,679,855 B2 * | 3/2010 | Biskeborn et al. | ........... | 360/68 |
| 7,796,355 B2 * | 9/2010 | Benakli et al. | ........... | 360/68 |
| 7,835,097 B1 * | 11/2010 | Aram et al. | ........... | 360/46 |
| 2008/0151436 A1 | 6/2008 | Sato et al. | | |
| 2011/0149441 A1 * | 6/2011 | Alex et al. | ........... | 360/245.8 |

* cited by examiner

Primary Examiner — Angel A. Castro
(74) Attorney, Agent, or Firm — Thomas R. Berthold

(57) ABSTRACT

Write enhancement circuitry on the head carrier of a magnetic recording disk drive provides additional write current overshoot beyond that provided by the write driver circuitry. An enhancement capacitor is formed with a dielectric layer between two layers of electrically-conductive magnetically-permeable shield material that serve as the capacitor plates. The write enhancement circuitry may also include an enhancement resistor. The enhancement capacitor and resistor are connected between the two terminals on the head carrier that connect to the write head coil. The capacitor and resistor are fabricated on the head carrier at the same time and in the same process as the read head. The first and second capacitor plates are generally coplanar with and formed of the same electrically-conductive magnetically-permeable material that forms the first and second magnetic shields for the read head. The enhancement resistor is a stack of layers that is coplanar with and formed of the same materials as the stack of layers that form the sensor portion of the read head between the two magnetic shields.

19 Claims, 13 Drawing Sheets

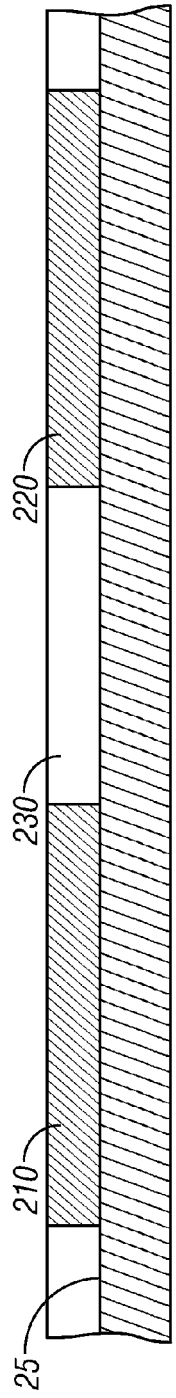
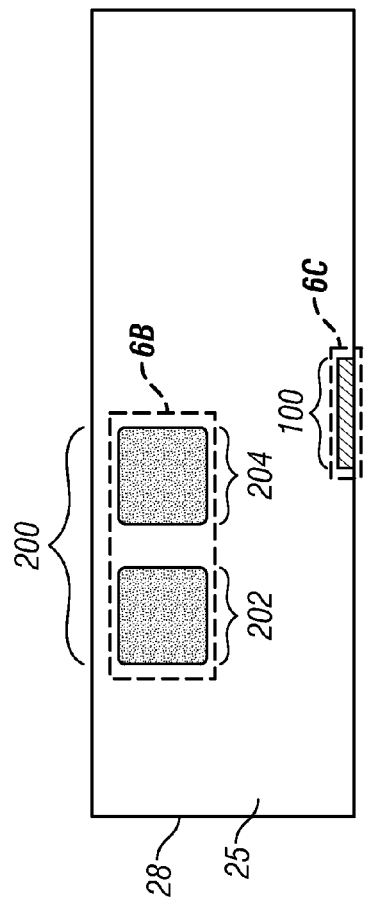
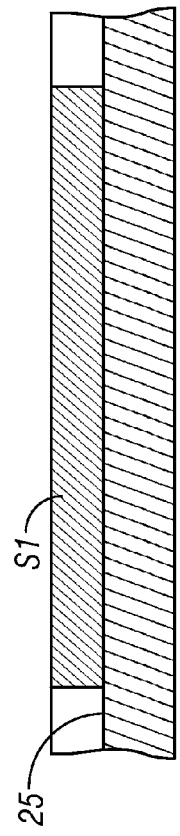
FIG. 6B
FIG. 6A
FIG. 6C

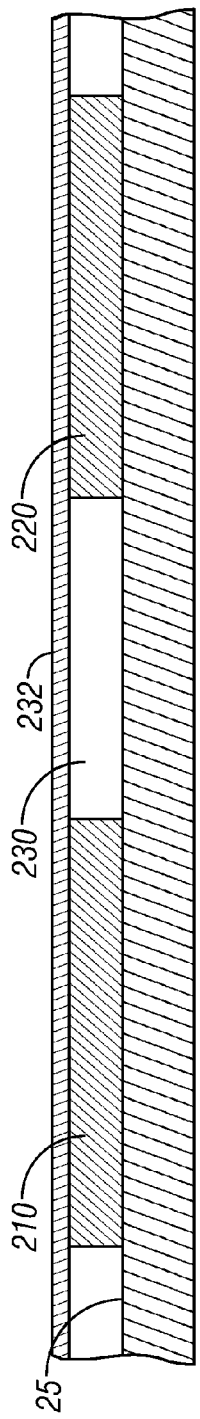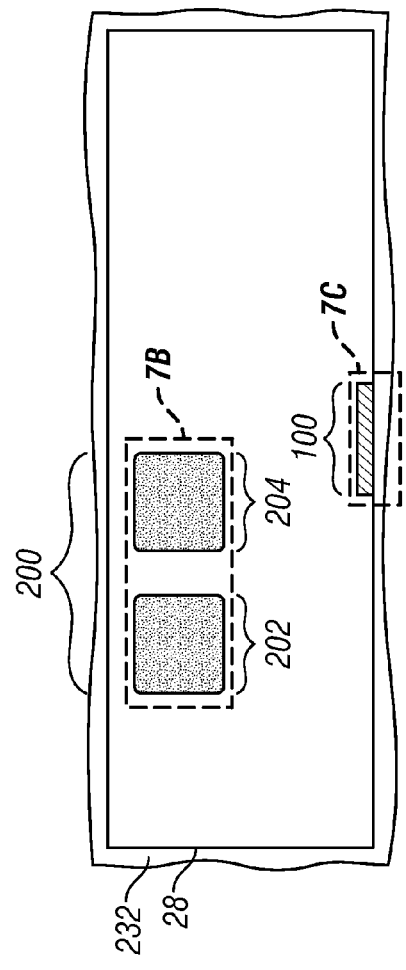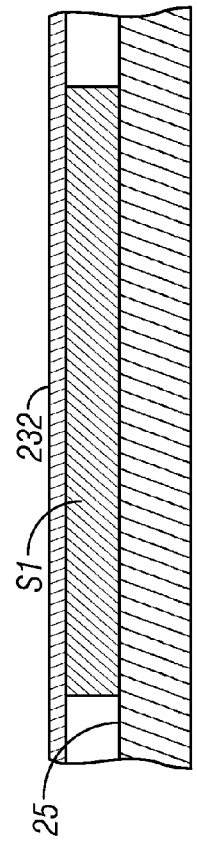

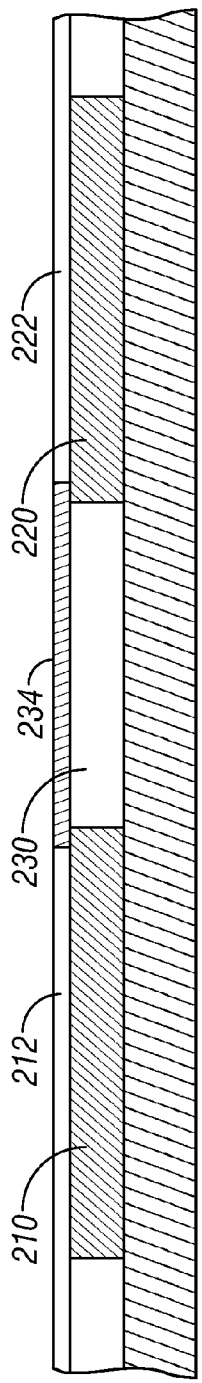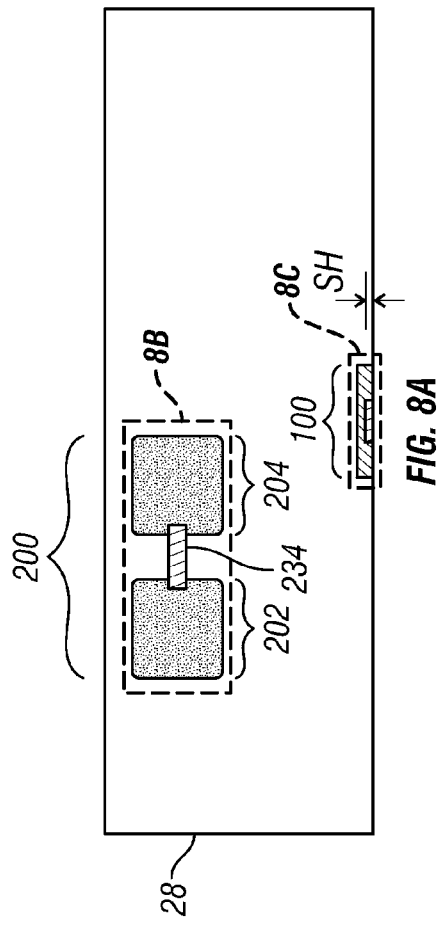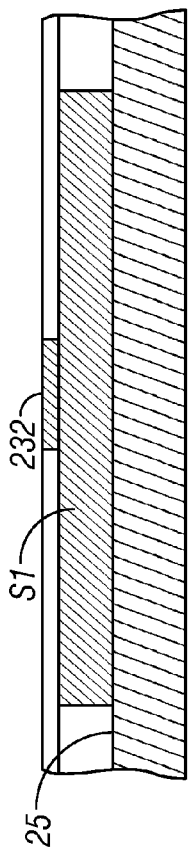
FIG. 8B
FIG. 8A
FIG. 8C

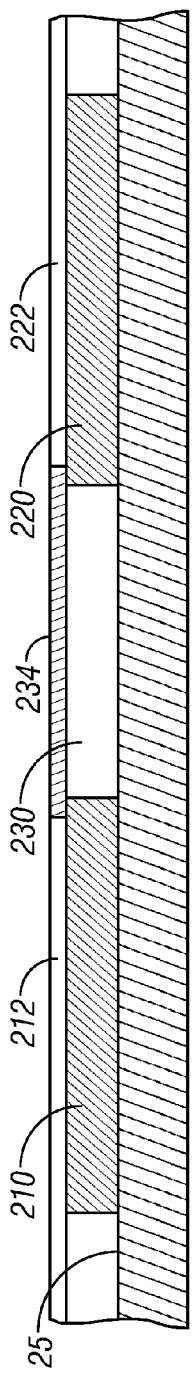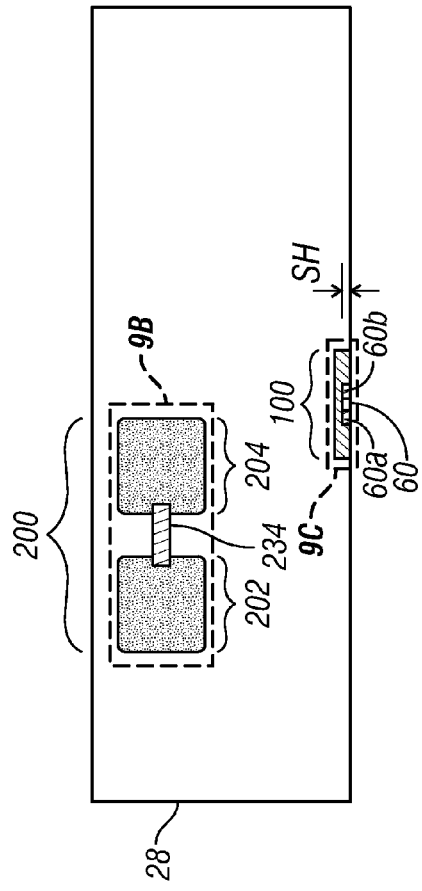

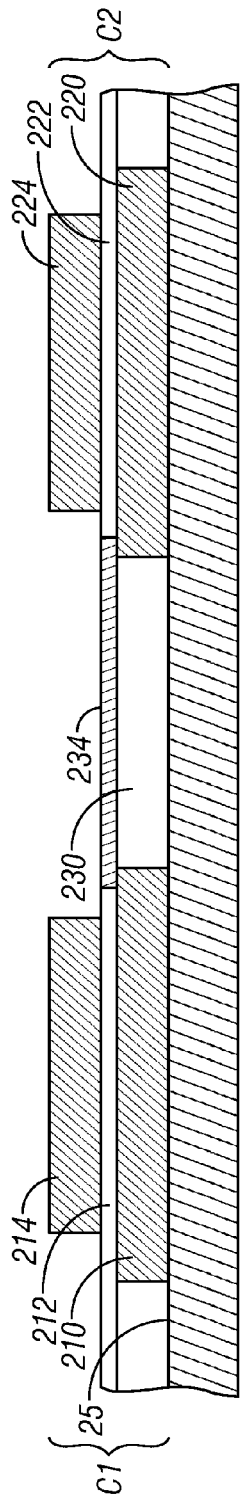
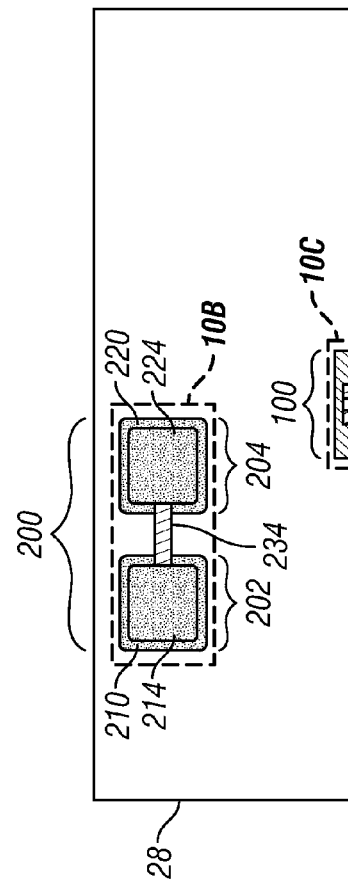
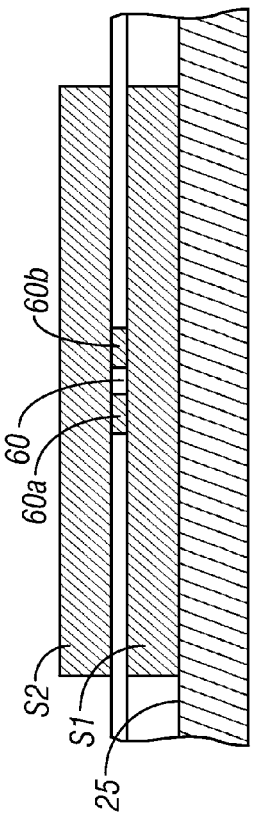
FIG. 10B
FIG. 10A
FIG. 10C

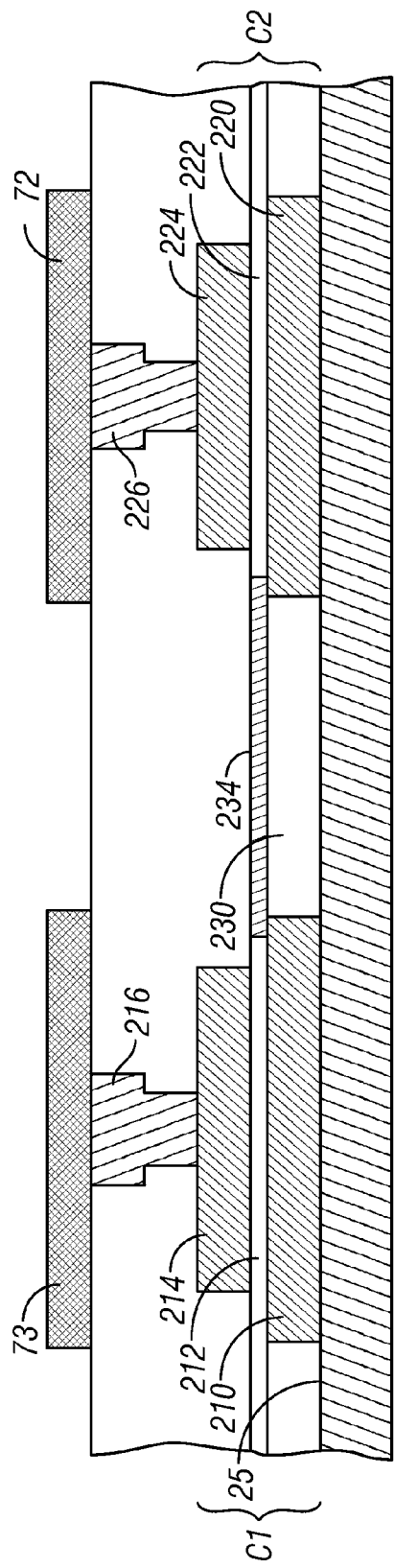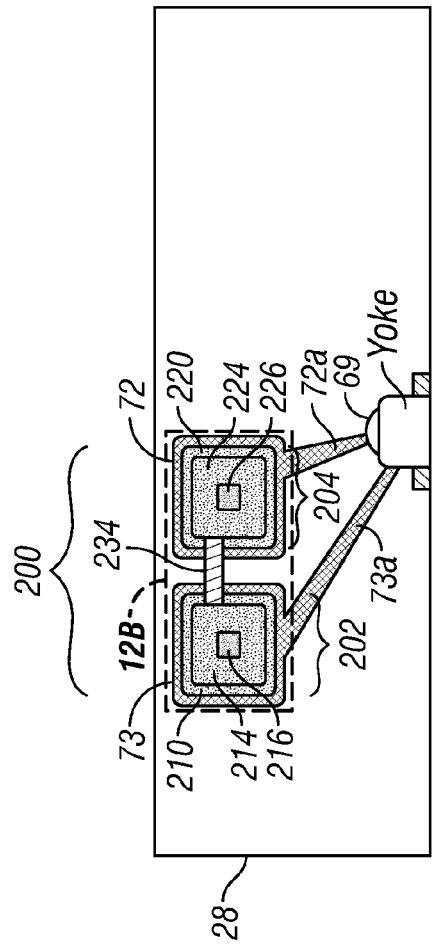
FIG. 12B
FIG. 12A

US 8,081,399 B2

PERPENDICULAR MAGNETIC RECORDING WRITE HEAD WITH ENHANCEMENT CAPACITOR ON SLIDER BODY FOR WRITE CURRENT OVERSHOOT AT WRITE CURRENT SWITCHING

BACKGROUND OF THE INVENTION

1. Field of the Invention

This invention relates generally to perpendicular magnetic recording systems, and more particularly to a system with fast switching of the magnetization direction of the perpendicular write head.

2. Description of the Related Art

Perpendicular magnetic recording, wherein the recorded bits are stored in a perpendicular or out-of-plane orientation in the recording layer, allows for ultra-high recording densities in magnetic recording hard disk drives. The write head must be able to write data not only at high bit-density but also at high data-rates. The write speed is particularly important in enterprise disk drives. However, the switching time for the write pole of the write head to switch from one magnetization direction to the other is a limiting factor as the data rate is increased. At high data-rates, the available magnetic flux from the write head, as seen by the recording layer on the disk, is limited by the low-frequency flux output of the write head. The reason for such loss of write flux includes a slow intrinsic time-constant of the magnetization reversal in the main pole of the write head.

It is known that additional overshoot of the write current from the disk drive's write driver circuitry can aid in the magnetization reversal speed. Write enhancement circuitry that provides additional overshoot beyond that provided by the write driver circuitry aids in overcoming signal transmission losses and reduces the required overshoot from the write driver. A faster reversal time with a lower write driver overshoot requirement significantly reduces the power of the overall front-end write system, i.e., the write driver, the interconnect between the write driver and the write head, and the write head. What is needed is write enhancement circuitry separate from the write driver that provides additional overshoot of the write current and that can be fabricated on the head carrier at the same time and using the same processes that are used to fabricate the read and write heads.

SUMMARY OF THE INVENTION

The invention relates to write enhancement circuitry on the head carrier of a magnetic recording disk drive that provides additional write current overshoot beyond that provided by the write driver circuitry. An enhancement capacitor with capacitance $C_E$ is formed with a dielectric layer between two layers of electrically-conductive magnetically-permeable shield material that serve as the capacitor plates. The capacitor may be formed on the head carrier in two pad regions, wherein the first and second shield layers and dielectric layer in the first pad region have a first electrical capacitance C1, and the first and second shield layers and dielectric layer in the second pad region have a second capacitance C2. Each capacitor is connected to a terminal on the head carrier, with the write head coil being electrically connected between the two terminals. The equivalent capacitance between the first and second terminals is the enhancement capacitance $C_E$, wherein each of C1 and C2 is substantially equal to $2C_E$. The write enhancement circuitry on the head carrier may also include an enhancement resistor with resistance $R_E$. The enhancement resistor is an electrically conductive strip that interconnects the first shield layer in the first pad region to the first shield layer in the second pad region.

The capacitors are fabricated on the head carrier at the same time and in the same process as the read head, such that the first and second capacitor plates are generally coplanar with and formed of the same electrically-conductive magnetically-permeable material that forms the first and second magnetic shields for the read head. The enhancement resistor is also fabricated at the same time and in the same process as the read head, with the enhancement resistor being formed of the same stack of layers as the stack of layers that form the sensor portion of the read head between the two magnetic shields.

The first and second terminals on the head carrier are adapted for connection to a write driver that has a voltage $V_D$ and resistance $R_{WD}$ for supplying a write current to the write head, wherein the write head has an inductance $L_H$ and resistance $R_H$. With the write enhancement circuitry on the head carrier, the write head has a write current response with an attenuation constant $\alpha=1/[2(R_{WD}+R_E)C_E]$. Proper selection of the values of the enhancement resistance $R_E$ and capacitance $C_E$ during fabrication enable the desired degree of damping (time constant) to be chosen. The resistance $R_E$ can be increased such that the amount of write current overshoot can be decreased (tuned down) for a given capacitance $C_E$. Eventually, with larger $R_E$ values ($R_E \gg R_{WM}$), the amount of overshoot from the enhancement capacitance $C_E$ is negligible.

For a fuller understanding of the nature and advantages of the present invention, reference should be made to the following detailed description taken together with the accompanying figures.

BRIEF DESCRIPTION OF THE DRAWING

FIGS. 6A-6C through 10A-10C show the process steps for forming the enhancement capacitor and enhancement resistor simultaneously with the conventional process for forming the read head and read head shields.

FIGS. 11A-11B through 12A-12B show the process steps for forming the electrical connections to the enhancement capacitor simultaneously with the conventional process for forming the write head yoke and coil.

DETAILED DESCRIPTION OF THE INVENTION

Figure 1:
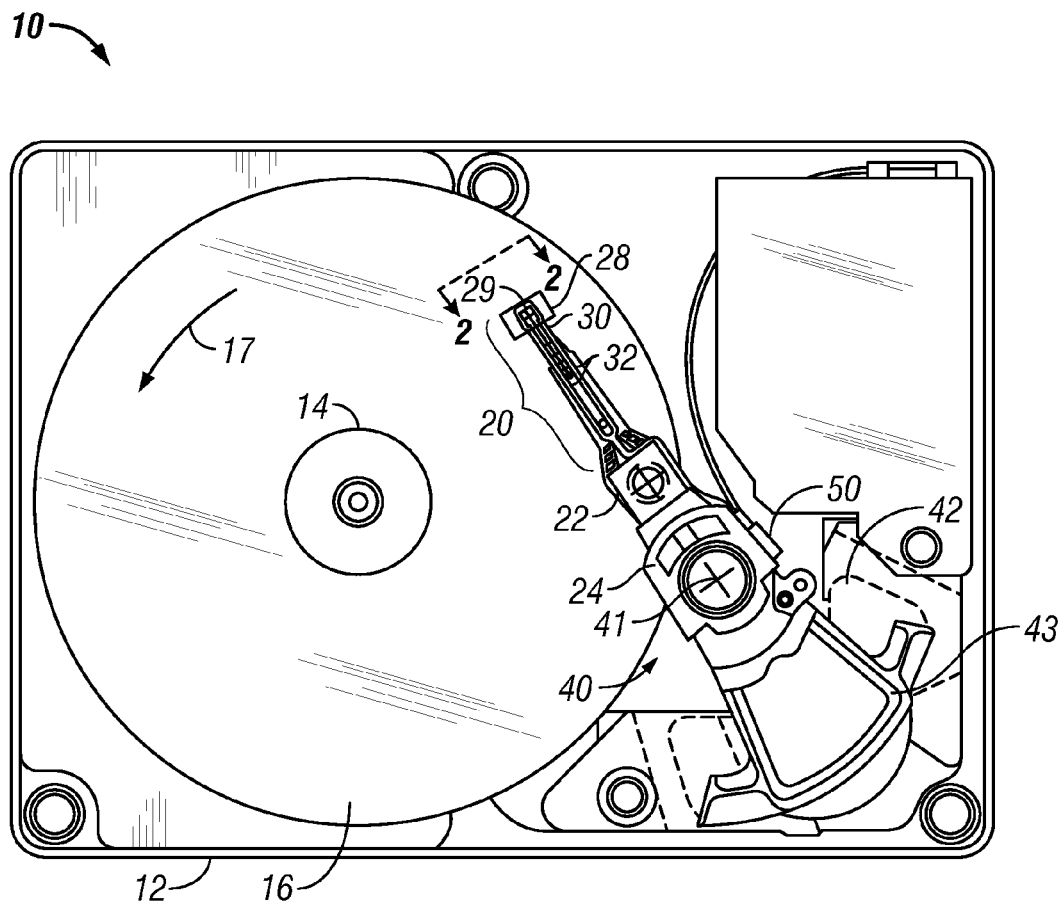
FIG. 1 is a top plan view of a head/disk assembly of a hard disk drive.

FIG. 1 is a top plan view of a head/disk assembly of a hard disk drive 10 like that for use with the present invention with the cover removed. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to a head carrier, for example an air-bearing slider 28. A magnetic recording read/write head 29 is located at the end or trailing surface 25 of slider 28. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2:
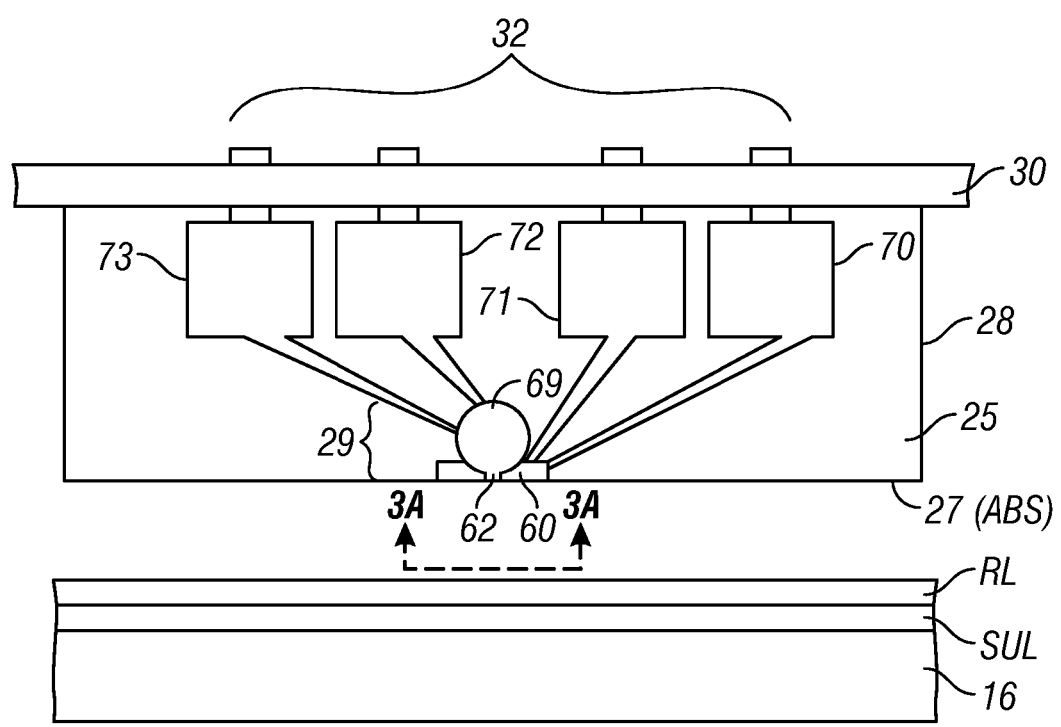
FIG. 2 is an enlarged end view of the slider and a section of the disk taken in the direction 2-2 in FIG. 1.

FIG. 2 is an enlarged end view of the slider 28 and a section of the disk 16 taken in the direction 2-2 in FIG. 1. The disk 16 includes a perpendicular magnetic data recording layer (RL) on a "soft" or relatively low-coercivity magnetically permeable underlayer (SUL) formed on the disk substrate. The slider 28 is attached to flexure 30 and has an air-bearing surface (ABS) 27 facing the RL on disk 16 and an end or trailing surface 25 generally perpendicular to the ABS 27. The ABS 27 causes the airflow from the rotating disk 16 to generate a bearing of air that supports the slider 28 in very close proximity to or near contact with the surface of disk 16. The read/write head 29 is formed as a series of thin films deposited on the slider 28 on its trailing surface 25. Typically a layer of insulating material, like alumina, is deposited over the read/write head 29 and serves as the outer surface of slider 28. The read/write head 29 includes a thin film read head 60, typically a magnetoresistive read head, and write head 62 that includes an electrically conductive coil 63. The read head 60 is connected to terminal pads 70, 71 on the trailing surface 25 of slider 28, and the coil 69 of write head 62 is connected to terminal pads 72, 73 on the trailing surface 25 of slider 28. The terminal pads 70, 71 and 72, 73 connect to the trace array 32 on flexure 30 for electrical connection to the read preamplifier and write driver in chip 50 (FIG. 1).

Figure 3A:
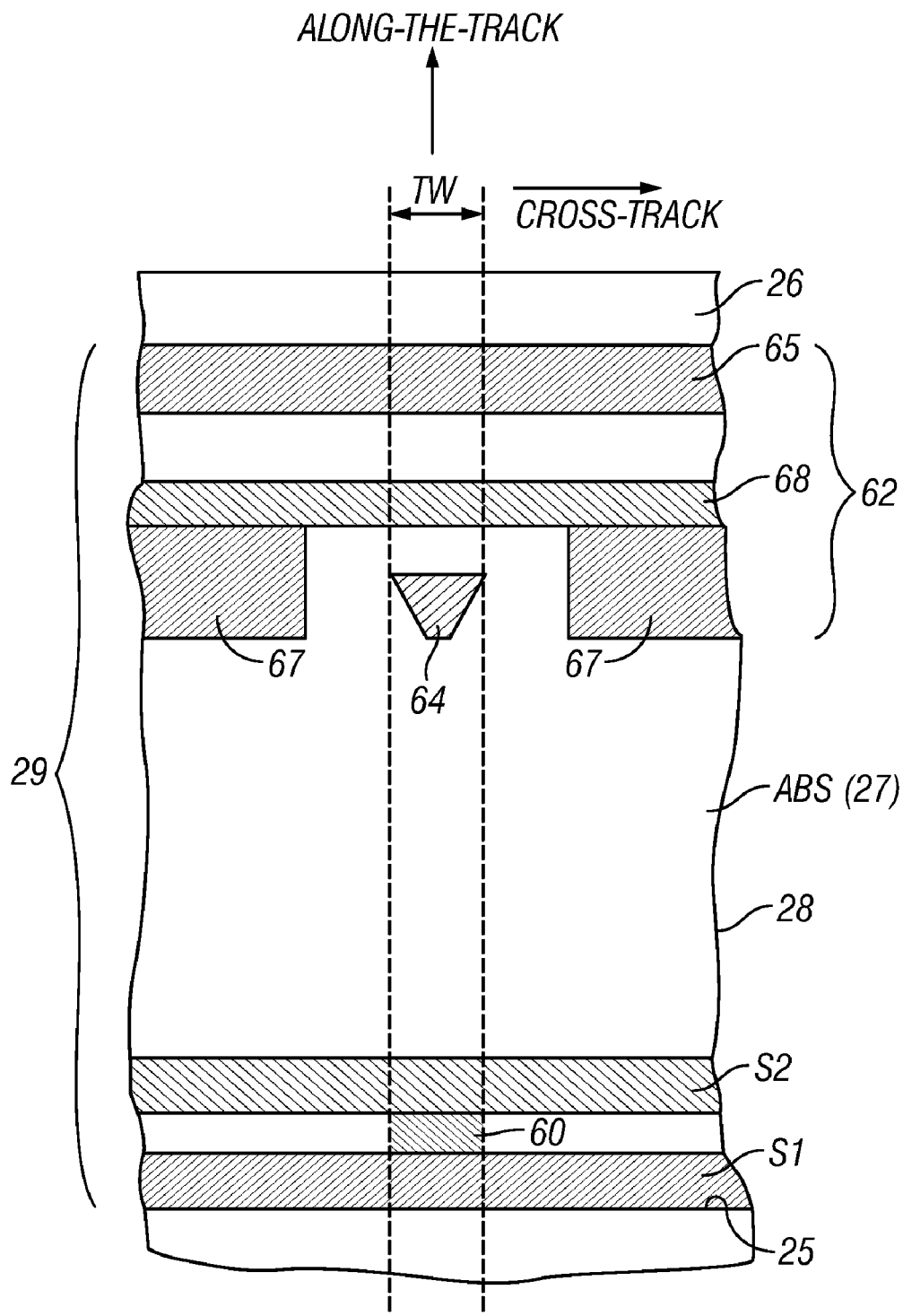
FIG. 3A is a view in the direction 3A-3A of FIG. 2 and shows the ends of the read/write head as viewed from the disk.

FIG. 3A is a view in the direction 3A-3A of FIG. 2 and shows the ends of read/write head 29 as viewed from the disk 16. The read/write head 29 includes a read head 60 with shields S1, S2 and a write head 62 that are formed as a series of thin films deposited and lithographically patterned on the trailing surface 25 of slider 28, with the films of the read head and shields being deposited first and the films of the write head being deposited over the read head and shields. The series of thin films are deposited and lithographically patterned using thin-film deposition and patterning techniques well-known in the art of thin-film magnetic recording head fabrication. The write head 62 includes a perpendicular magnetic write pole WP 64 and may also include a trailing shield 68 and/or side shields 67. The read head 60 is located between two magnetic shields S1 and S2, with first shield S1 being located on trailing surface 25. The shields S1, S2 are formed of magnetically permeable material like NiFe and are electrically conductive so they can also function as the electrical leads to the read head 60. Separate electrical leads may also be used, in which case the read head 60 is formed in contact with layers of electrically conducting lead material, such as tantalum, gold, or copper, that are in contact with the shields S1, S2.

The write head 62 has a perpendicular write head and includes magnetic write pole WP 64 and flux return pole 65. The tip of WP 64 may be generally surrounded at the ABS by optional side shields 67 and trailing shield 68. The trailing shield 68 and side shields 67 may be connected to form a wraparound shield (WAS). The WAS is described in detail as a shield for a conventional perpendicular recording head in U.S. Pat. No. 7,002,775 B2 assigned to the same assignee as this application. The WAS, which is separated from the tip of WP 64 by nonmagnetic gap material, alters the angle of the write field and improves the write field gradient at the point of writing, and also shields the writing field at regions of the disk away from the track being written. The shields S1, S2 for the read head 60 and the shields 67, 68 for the tip of WP 64 are formed of magnetically permeable material. A layer of insulating material, like alumina ($Al_2O_3$), is deposited over the write head 60, resulting in an outer surface 26. The width of the tip of WP 64 and the read head 60 in the cross-track direction correspond generally to the trackwidth (TW) of the data tracks on the disk 16.

Figure 3B:
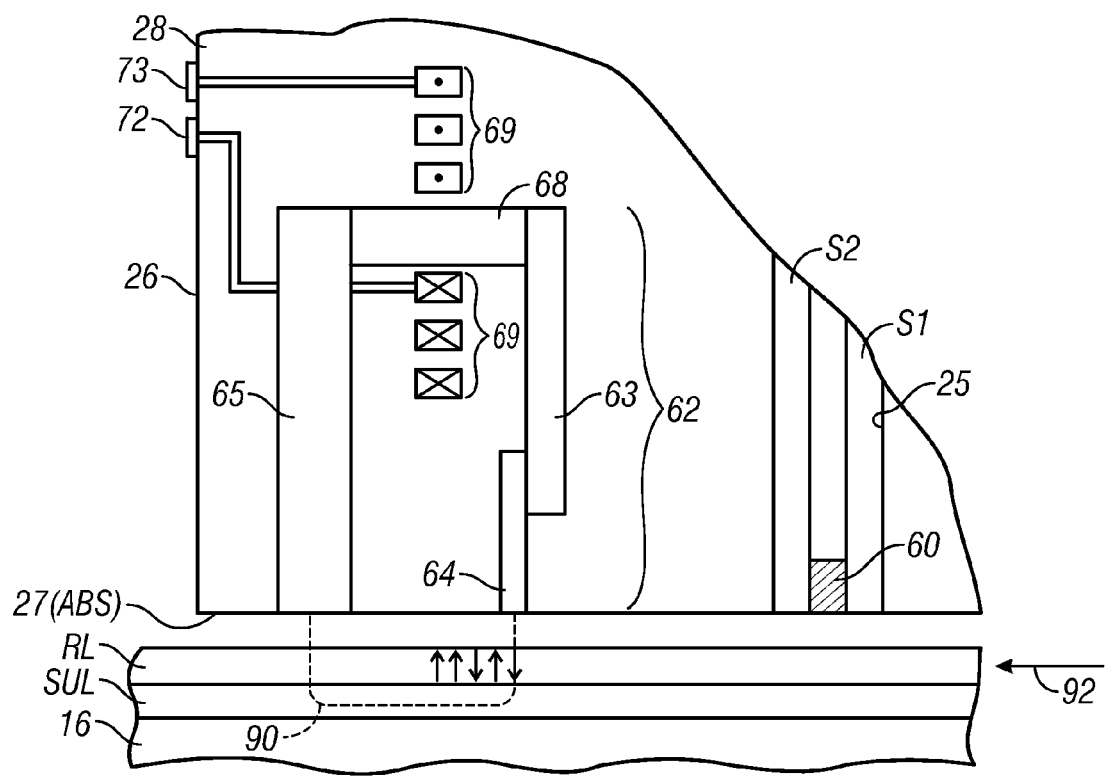
FIG. 3B is a sectional view of a portion of a slider showing a prior art perpendicular write head with a pancake coil and a portion of a perpendicular magnetic recording disk.

FIG. 3B is a sectional view of a portion of slider 28 showing the perpendicular write head 62 and a portion of the perpendicular magnetic recording disk 16. The write head 62 includes a yoke made up of the main pole 63, flux return pole 65, and yoke stud 68 connecting the main pole 63 and flux return pole 65, and a thin film "pancake" coil 69 shown as sections wrapped around yoke stud 68. The return pole 65 and yoke stud 68 are formed of soft ferromagnetic material, such as alloys of NiFe, CoFe and NiFeCo that are typically formed by electroplating. The write head 62 in FIG. 3B is depicted without the optional WAS (FIG. 3A). The coil 69 is connected to terminals 72, 73 (FIG. 2), on the outer surface 26 of slider 28. The write pole (WP) 64 is part of the main pole 63 and has a pole tip that faces the surface of disk 16. The WP 64 is formed of a high-moment material, such as a high-moment CoFe alloy, that is typically formed by sputter deposition, and may be a laminated structure. Write current through the thin film coil 69 induces a magnetic field (shown by dashed line 90) from the WP 64 that passes through the RL (to magnetize the region of the RL beneath the WP 64), through the flux return path provided by the SUL, and back to the return pole 65. The slider 28 has its air-bearing surface (ABS) 27 supported above the surface of disk 16 as the disk 16 moves past the write head 62 in the direction indicated by the arrow 92. The RL is illustrated with a perpendicularly recorded or magnetized region representing data adjacent to the pole tip 64. Preceding regions are shown having random prerecorded magnetization directions, as represented by the arrows in the RL. The magnetic transitions are detectable by the read head 60, located between the two magnetic shields S1, S2, as the recorded bits. The write coil 69 is called a "pancake" coil because it is deposited and patterned on the trailing end of the slider as essentially a single layer and thus all of the coil turns lie in substantially the same plane. When write current from the write driver in chip 50 (FIG. 1) is directed to coil 69 in one direction, for example in FIG. 3B out of the paper in the upper coil sections 69 with dots and into the paper in the lower coil sections 69 with the Xs, the region of the RL beneath the tip of WP 64 is magnetized in one direction, down or into the disk in FIG. 3B. When the write driver switches the direction of the write current to coil 69, the region of the RL beneath the tip of WP 64 is magnetized in the opposite direction, i.e., up or out of the disk in FIG. 3B.

In this invention electrical enhancement circuitry is located on the slider body for increasing the overshoot of the write current at the time of current switching. This increases the speed of magnetization reversal of the write pole. It is known that passive electrical components, such as capacitors and resistors, can be fabricated on the slider body. However, these components are fabricated separately from the fabrication of the read and write heads, typically after the read and write heads have been fabricated, and are typically located on the outer surface of the slider body. U.S. Pat. No. 6,603,623 B1 and U.S. Pat. No. 7,545,608 B2 describe sliders with such passive components.

Figure 4:
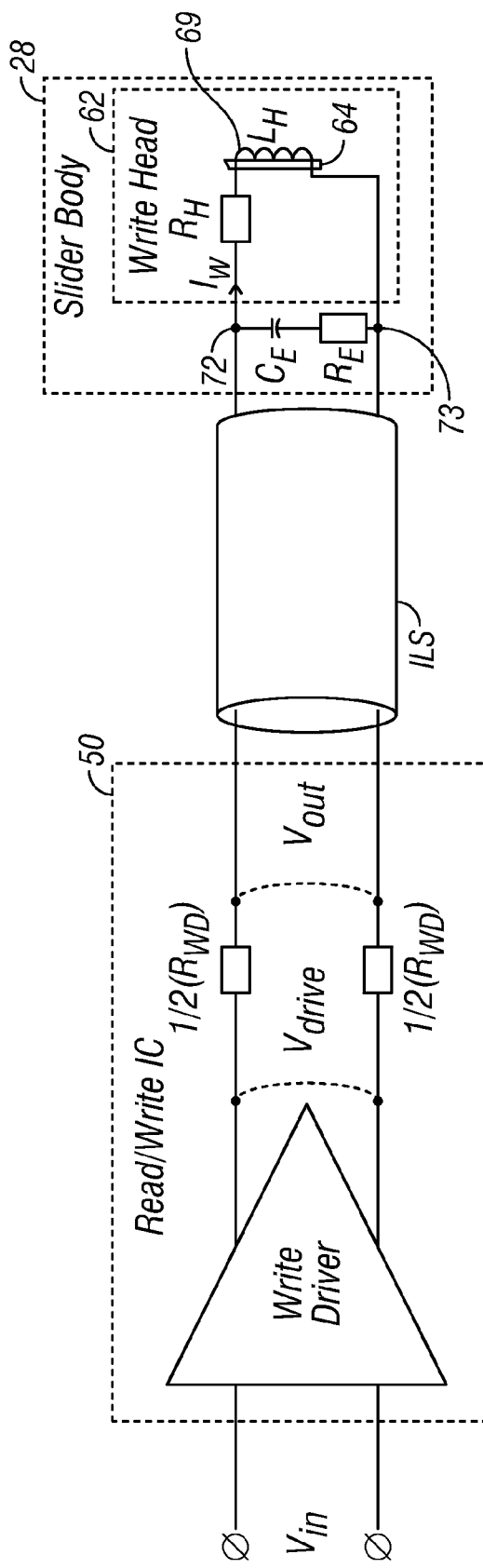
FIG. 4 shows the electrical enhancement circuitry, in the form of enhancement capacitor $C_E$ and optional enhancement resistor $R_E$, located between the write driver and the write head.

FIG. 4 shows the electrical enhancement circuitry in the form of enhancement capacitor $C_E$ and optional enhancement resistor $R_E$ located between the write head terminals 72, 73 on slider 28. The write head 62 is shown as having a resistance $R_H$ and a coil 69 with inductance $L_H$. The write driver circuitry is in the read/write integrated circuit of chip 50 (FIG. 1) that is located away from the slider, typically on the E-block 24 (FIG. 1). The write driver operates at a voltage $V_{drive}$ and has a resistance $R_{WD}$, represented by two resistors, each with resistance $R_{WD}/2$. The write driver is connected via interconnect lines on the integrated lead suspension (ILS) to the write coil 69 of write head 62 via terminals 72, 73. To write data the write current $I_W$ switches direction to reverse the magnetization of the write pole 64.

The Laplace equation that determines the current ($I_w$) response for the case with $R_E=0$ and $R_H \ll 10\Omega$ is expressed in Equation (1) below:

$$I_w(s) = \frac{V_{drive}/R_{WD}L_H C_E}{s^2 + \frac{1}{R_{WD}C_E}s + \frac{1}{L_H C_E}} \quad \text{Equation (1)}$$

Equation (1) can be expressed by Equation (2) as:

$$I_w(s) = \frac{V_{drive}/R_{WD}L_H C_E}{s^2 + 2\alpha s + \omega_0^2} \quad \text{Equation (2)}$$

Where:

$$\alpha = \frac{1}{2R_{WD}C_E}, \quad \omega_0 = \frac{1}{\sqrt{L_H C_E}}$$

Figure 5:
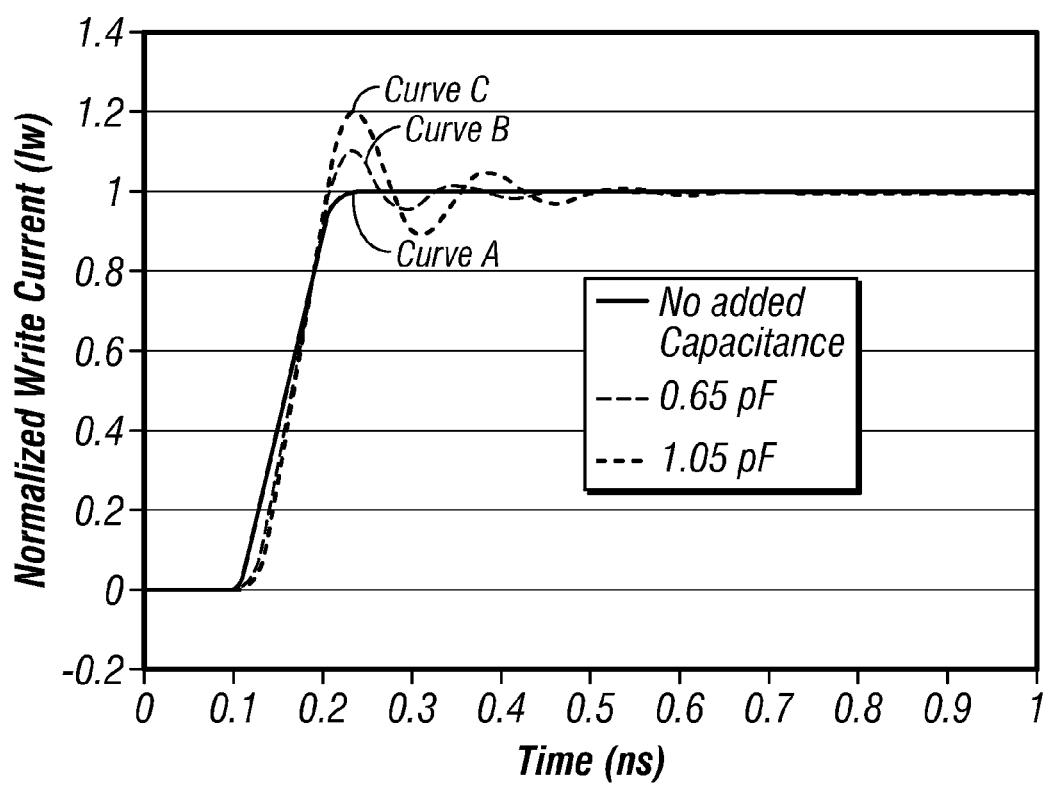
FIG. 5 is a graph of the time domain response for the write current $I_W$ when there is no enhancement capacitor $C_E$ (Curve A) and when there is an enhancement capacitor $C_E$ with different values of $C_E$ (Curves B and C).

The current response of the front-end system ($I_w(s)$) is described in Equation (1), which can be reformed using the generalized attenuation constant, $\alpha$, resonance frequency, $\omega_0$. By increasing the enhancement capacitance, $C_E$, the attenuation constant decreases, thereby increasing the overshoot of the write current. Using typical values of inductance ($L_H$=0.5 nH), termination ($R_{WD}$=50$\Omega$), the added capacitance, $C_E$, can significantly increase the overshoot to between about 10 to 20% ($\alpha$=15.4×10$^9$/s, 9.5×10$^9$/s, $C_E$=0.65, 1.05 pF, respectively). FIG. 5 shows the time domain response for $I_W$ for different values of $C_E$ and thus different values of the attenuation constant $\alpha$. Curve A is for the case where there is no enhancement capacitor $C_E$, curve B is for the case where $C_E$ is 0.65 pF, and Curve C is for the case where $C_E$ is 1.05 pF. The system response with overshoot (Curves B and C) is desirable to assist with the magnetization reversal in the write pole.

In Equation (2), there is no enhancement resistor $R_E$. However, the added optional series enhancement resistance, $R_E$, can be used to adjust damping and thereby adjust the amount of write current overshoot (enhancement) at switching. The Laplace equation that includes $R_E$ for the current ($I_w$) response is expressed in Equation (3) below:

$$I_w(s) = \frac{V_{drive}\left(R_E s + \frac{1}{C_E}\right)\frac{1}{(R_{WD}+R_E)L_H}}{s^2 + \left(\frac{R_{WD}R_E}{(R_{WD}+R_E)L_H} + \frac{1}{(R_{WD}+R_E)C_E}\right)s + \frac{R_{WD}}{(R_{WD}+R_E)}\frac{1}{L_H C_E}} \quad \text{Equation (3)}$$

Equation (3) can be expressed by Equation (4) as:

$$I_w(s) = \frac{V_{drive}\left(s + \frac{1}{R_E C_E}\right)\frac{R_E}{(R_{WD}+R_E)L_H}}{s^2 + 2(\alpha_1+\alpha_2)s + \omega_1^2} \quad \text{Equation (4)}$$

Where:

$$\alpha_1 = \frac{R_{WD}R_E}{2(R_{WD}+R_E)L_H}, \quad \alpha_2 = \frac{1}{2(R_{WD}+R_E)C_E}, \quad \omega_1^2 = \frac{R_{WD}}{(R_{WD}+R_E)}\frac{1}{L_H C_E}$$

By adjusting the value of the enhancement resistor, $R_E$, and capacitance, $C_E$, there are more degrees of damping (time constant) that can be achieved. Therefore, the $R_E$ resistance can be increased such that the amount of overshoot can be decreased (tuned down) for a given capacitor. Eventually, with larger $R_E$ values ($R_E \gg R_{WD}$), the amount of overshoot from the $C_E$ is negligible.

In this invention the enhancement capacitor and optional enhancement resistor are not fabricated separately on the slider body, but are formed as part of the same process used to form the read head and read head shields. The capacitive plates for the enhancement capacitor are formed at the same time and of the same material as the read head shields S1 and S2. The dielectric material between the capacitive plates is deposited at the same time and of the same material as the insulating material surrounding the read head. The optional enhancement resistor is formed at the same time and of the same materials as the stack of layers making up the conventional read head.

FIGS. 6A-6C through 10A-10C show the process steps for forming the enhancement capacitor and enhancement resistor simultaneously with the conventional process for forming the read head and read head shields. FIGS. 11A-11B through 12A-12B show the process steps for forming the electrical connections to the enhancement capacitor simultaneously with the conventional process for forming the write head yoke and coil. Each of FIGS. 6A-12A is a view of the trailing surface 25 of slider 28 (FIG. 2) at various stages of the process, FIGS. 6B-12B are sectional views of FIGS. 6A-12A, respectively, taken through the terminal pad region, and FIGS. 6C-10C are sectional views of FIGS. 6A-10A, respectively, taken through the head region.

FIGS. 6A-6C show the structure after full film deposition, patterning and planarization of shield layer S1. The material of S1, which is typically an electrically conductive and magnetically permeable material like permalloy ($Ni_{80}Fe_{20}$), is electroplated through a photoresist mask on the surface 25 of slider 28, typically to a thickness of about 1 micron. In the conventional process for forming the read head, the layer of S1 material is deposited to form the read head region 100. However, in this invention the layer of S1 material is also deposited to form the pad region 200 (first and second pad regions or sections 202, 204) at the same time the head region 100 is patterned. Insulating material, typically alumina ($Al_2O_3$), is then deposited into the regions of surface 25 where the S1 material was not deposited, and the structure then planarized. The result is the lower shield S1 on surface 25 in the head region 100 (FIG. 6C) and lower capacitive plates 210, 220 formed of S1 material on surface 25 in respective pad sections 202, 204 (FIG. 6B). Lower capacitive plates 210, 220 are separated and electrically isolated from one another by insulating material 230 in the region between the two pad sections 202, 204.

FIGS. 7A-7C show the structure after the film stack 232 making up the read head has been deposited as a series of films over the planarized structure of FIGS. 6A-6C. The stack 232 includes the films that make up a conventional magnetoresistive (MR) read head, such as a giant MR (GMR) spin-valve or tunneling MR (TMR) read head. The individual layers in the stack 232 typically include one or more seed layers on the S1 layer, an antiferromagnetic layer such as IrMn or NiMn, a pinned ferromagnetic layer, a nonmagnetic spacer layer, typically Cu in the case of a GMR read head or MgO in the case of a TMR read head, a free ferromagnetic layer, and a capping layer, typically Ta, Ru or a multilayer of Ta and Ru. The pinned and free ferromagnetic layers are typically formed of an alloy that includes two or more of Ni, Co and Fe. The total thickness of the stack 232 is about 25 to 35 nm.

FIGS. 8A-8C show the structure after the film stack 232 (FIG. 8C) has been lithographically patterned and then refilled with dielectric material, typically alumina. In the conventional process for forming the read head, the film stack 232 is lithographically patterned to define the stripe height (SH) of the read head in head region 100. However, in this invention the film stack 232 is also lithographically patterned to form the electrically conductive strip 234 that connects the first and second capacitive plates 210, 220, respectively, so that the SH of the read head and the shape of the conductive strip 234 are defined in the same process step. The strip 234 will function as the enhancement resistor $R_E$ in the completed structure. The width and length of the strip 234 are selected prior to patterning based on the desired resistance value for $R_E$ and the known electrical resistivity of the stack 232. Insulating material, typically alumina, is then deposited into the regions where the material of stack 232 was removed, and the structure then planarized. This leaves the read head portion of film stack 232 surrounded by insulating material (FIG. 8C). This also leaves the first and second capacitive plates 210, 220 connected by electrically conducting strip 234 and covered with insulating material 212, 222, that will serve as the dielectric material for the capacitors (FIG. 8B).

In FIGS. 9A-9C the pad sections 202, 204 are covered with protective resist while the film stack in the head region 100 is patterned to define the TW (FIG. 9C) of the read head 60 on the S1 layer in the read head region 100. Also the read head side regions 60a, 60b are formed, typically to form ferromagnetic material for hard biasing of the free ferromagnetic layer of the read head 60.

FIGS. 10A-10C show the structure of FIGS. 9A-9C after full film deposition, patterning and planarization of top or second shield layer S2. The material of S2, which is typically an electrically conductive and magnetically permeable material like permalloy, is electroplated through a photoresist mask on the planarized surface of the structure shown in FIG. 9A, typically to a thickness of about 0.5 to 1 micron. In the conventional process for forming the read head, the photoresist mask defines the shape of S2 (FIG. 10C) to complete the read head 60 between S1 and S2. However, in this invention the photoresist mask also defines the top capacitive plates 214, 224 over respective dielectric layers 212, 214 and lower capacitive plates 210, 220, so that when the S2 material is electroplated the top capacitive plates 214, 224 are formed at the same time S2 is formed in the head region 100. The area of the top capacitive plates 214, 224 is selected prior to patterning based on the desired value of the enhancement capacitance $C_E$ and the known thickness and permittivity of the dielectric layers 212, 214. In the embodiment where there are two capacitors, C1 and C2, in series, if the capacitors are selected to have equal values of capacitance, then each capacitor will have a capacitance $2C_E$ so that the equivalent capacitance across terminals 72, 73 (FIG. 4) is $C_E$. After deposition and patterning of the layer of S2 material, the result is the completed read head 60 between S1 and S2 in the head region 100 (FIG. 10C) and capacitors C1, C2 in respective pad sections 202, 204 and connected by $R_E$ in the form of conductive strip 234 (FIG. 10B).

Figure 11B:
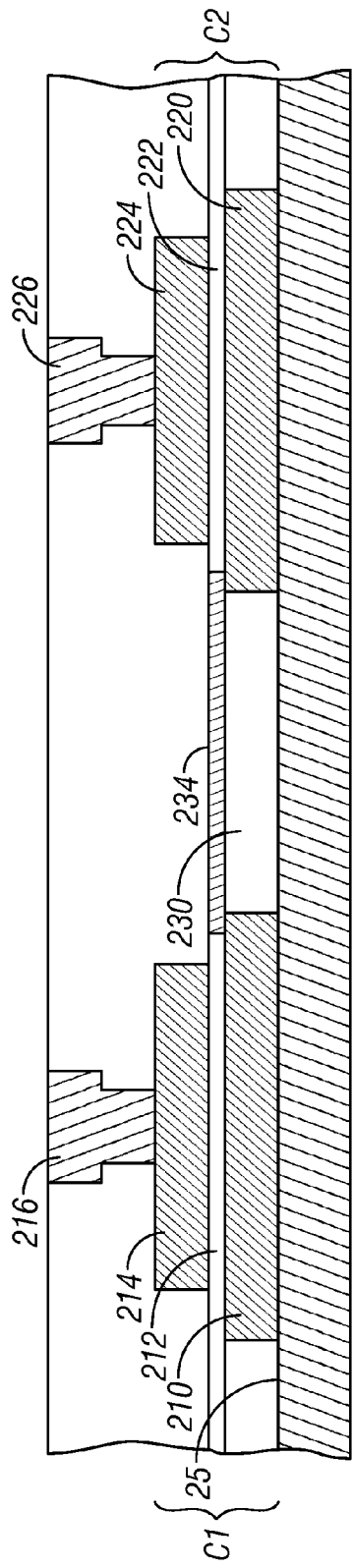
Figure 11A:
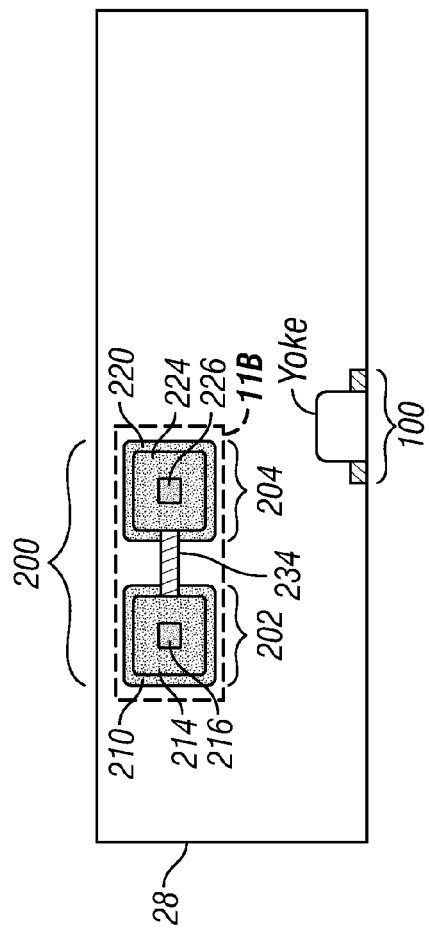

After the read head and shields have been completed, fabrication of the conventional read/write head continues with fabrication of the write head, including the coil 69 and the yoke (made up of the main pole 63, write pole 64, flux return pole 65, and yoke stud 68 connecting the main pole 63 and flux return pole 65, as shown in FIG. 3B). In FIGS. 11A-11B portions of the write head yoke and connection studs 216, 226 on capacitors C1, C2, respectively, are fabricated simultaneously in a series of conventional deposition and patterning steps. The connection studs 216, 226 can thus be formed of the same material as the yoke material, typically electrically conductive magnetically permeable material like NiFe. Additional insulating material, like alumina, is then deposited and planarized to fill the region between the connection studs 216, 226 and underlying capacitors C1, C2.

In FIGS. 12A-12B, the electrically conductive material, typically Cu, is deposited and patterned on the structure of FIGS. 11A-11B to form the write coil 69, the terminals 72, 73 and the leads 72a, 73a connecting the terminals 72, 73 to the coil 69. FIG. 12B shows the sectional view of the two pad sections 202, 204. When write current is directed from the write driver (FIG. 4) to the coil 69 it passes from one terminal 72 to lead 72a, coil 69, lead 73a and back to the other terminal 73. There is also a conductive path from terminal 73 to capacitor C1 (with capacitance $2C_E$), across strip 234 with resistance $R_E$, to capacitor C2 (with capacitance $2C_E$) and terminal 72.

FIGS. 6A-6C through 10A-10C and FIGS. 11A-11B through 12A-12B show the process steps for forming the enhancement capacitor and the optional enhancement resistor. However, the enhancement capacitor can be fabricated in substantially the same process steps without fabrication of the enhancement resistor. To fabricate the enhancement capacitor without the enhancement resistor, the process step shown in FIGS. 6A-6B is modified by patterning lower capacitive plates 210, 220 as a single plate without the insulating separation region 230 so that the S1 material forms an electrically conductive path between the first and second pad regions 202, 204. Then, in FIGS. 8A-8B, no conductive strip 234 is formed. The process then continues as in FIGS. 9A-9C, 10A-10C, 11A-11B and 12A-12B. The completed structure is then like that shown in FIG. 12B, except there is no insulating region 230 and no conductive strip 234, and the lower capacitive plates 210, 220 form a single common lower capacitive plate. The electrical connection from C1 to C2 is through the electrically conductive common lower capacitive plate formed of the S1 material.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A head carrier for a magnetic recording disk drive read/write head comprising:
   a carrier substrate having a generally planar surface with a head region and first and second electrical terminal pad regions;
   a first shield layer of electrically-conductive magnetically-permeable material in the head and pad regions, the first shield layer in the pad regions being coplanar with the first shield layer in the head region;
   a layer of dielectric material on the first shield layer in the head and pad regions, the dielectric layer in the pad regions being coplanar with the dielectric layer in the head region;
   a second shield layer of electrically-conductive magnetically-permeable material on the dielectric layer in the head and pad regions, the second shield layer in the pad regions being coplanar with the second shield layer in the head region;
   a first electrically conductive terminal connected to the second shield layer in the first pad region and a second electrically conductive terminal connected to the second shield layer in the second pad region; and
   a write head comprising an electrically conductive coil on the substrate, the coil having a first end electrically connected to the first terminal and a second end electrically connected to the second terminal.

2. The head carrier of claim 1 wherein the first shield layer in the pad region forms an electrically conductive path between the first and second pad regions, and further comprising electrically insulating material between the second shield layer in the first pad region and the second shield layer in the second pad region.

3. The head carrier of claim 2 wherein the first and second shield layers and dielectric layer in the first pad region have a first electrical capacitance C1, and the first and second shield layers and dielectric layer in the second pad region have a second capacitance C2.

4. The head carrier of claim 3 wherein the equivalent capacitance between the first and second terminals is an enhancement capacitance $C_E$, and wherein each of C1 and C2 is substantially equal to $2C_E$.

5. The head carrier of claim 4 wherein the first and second terminals are adapted for connection to a write driver having a voltage $V_D$ and resistance $R_{WD}$ for supplying a write current to the write head, wherein the write head has an inductance $L_H$ and resistance $R_H$, and wherein the write head has a write current response with an attenuation constant $\alpha=1/(2R_{WD}C_E)$.

6. The head carrier of claim 1 further comprising electrically insulating material between the first shield layer in the first pad region and the first shield layer in the second pad region, an electrically conductive strip interconnecting the first shield layer in the first pad region to the first shield layer in the second pad region, and electrically insulating material between the second shield layer in the first pad region and the second shield layer in the second pad region.

7. The head carrier of claim 6 further comprising a read head stack of layers on the first shield layer in the head region and on the first shield layer in the first and second pad regions, the read head stack in the head region being generally coplanar with the read head stack in the first and second pad regions, wherein the read head stack in the first and second pad regions forms said electrically conductive strip interconnecting the first shield layer in the first pad region to the first shield layer in the second pad region.

8. The head carrier of claim 6 wherein the first and second shield layers and dielectric layer in the first pad region have a first electrical capacitance C1, the first and second shield layers and dielectric layer in the second pad region have a second capacitance C2, and said strip has an electrical resistance $R_E$.

9. The head carrier of claim 8 wherein the equivalent capacitance between the first and second terminals is an enhancement capacitance $C_E$, and wherein each of C1 and C2 is substantially equal to $2C_E$.

10. The head carrier of claim 9 wherein the first and second terminals are adapted for connection to a write driver having a voltage $V_D$ and resistance $R_{WD}$ for supplying a write current to the write head, wherein the write head has an inductance $L_H$ and resistance $R_H$, and wherein the write head has a write current response with an attenuation constant $\alpha=1/[2(R_{WD}+R_E)C_E]$.

11. The head carrier of claim 1 wherein the write head includes a yoke formed of magnetically permeable material, and further comprising first and second connection studs formed of the same material as said yoke, the first connection stud located between the first electrically conductive terminal and the second shield layer in the first pad region and the second connection stud located between the second electrically conductive terminal and the second shield layer in the second pad region.

12. A head carrier for a magnetic recording disk drive read/write head comprising:
   a carrier substrate having first and second electrical terminal pad regions;
   a first shield layer of electrically-conductive magnetically-permeable material in the pad regions;
   a layer of dielectric material on the first shield layer in the pad regions;
   a second shield layer of electrically-conductive magnetically-permeable material on the dielectric layer in the pad regions, wherein the first and second shield layers and dielectric layer in the first pad region have a first electrical capacitance C1, and the first and second shield layers and dielectric layer in the second pad region have a second capacitance C2;
   a first electrically conductive terminal connected to the second shield layer in the first pad region and a second electrically conductive terminal connected to the second shield layer in the second pad region; and
   a write head comprising an electrically conductive coil on the substrate, the coil having a first end electrically connected to the first terminal and a second end electrically connected to the second terminal.

13. The head carrier of claim 12 wherein the first shield layer in the pad regions forms an electrically conductive path between the first and second pad regions, and further comprising electrically insulating material between the second shield layer in the first pad region and the second shield layer in the second pad region.

14. The head carrier of claim 12 wherein the equivalent capacitance between the first and second terminals is an enhancement capacitance $C_E$, and wherein each of C1 and C2 is substantially equal to $2C_E$.

15. The head carrier of claim 14 wherein the first and second terminals are adapted for connection to a write driver having a voltage $V_D$ and resistance $R_{WD}$ for supplying a write current to the write head, wherein the write head has an inductance $L_H$ and resistance $R_H$, and wherein the write head has a write current response with an attenuation constant $\alpha=1/(2R_{WD}C_E)$.

16. The head carrier of claim 12 further comprising electrically insulating material between the first shield layer in the first pad region and the first shield layer in the second pad region, an electrically conductive strip having an electrical resistance $R_E$ interconnecting the first shield layer in the first pad region to the first shield layer in the second pad region, and electrically insulating material between the second shield layer in the first pad region and the second shield layer in the second pad region.

17. The head carrier of claim 16 wherein the equivalent capacitance between the first and second terminals is an enhancement capacitance $C_E$, and wherein each of C1 and C2 is substantially equal to $2C_E$.

18. The head carrier of claim 17 wherein the first and second terminals are adapted for connection to a write driver having a voltage $V_D$ and resistance $R_{WD}$ for supplying a write current to the write head, wherein the write head has an inductance $L_H$ and resistance $R_H$, and wherein the write head has a write current response with an attenuation constant $\alpha=1/[2(R_{WD}+R_E)C_E]$.

19. The head carrier of claim 12 wherein the write head includes a yoke formed of magnetically permeable material, and further comprising first and second connection studs formed of the same material as said yoke, the first connection stud located between the first electrically conductive terminal and the second shield layer in the first pad region and the second connection stud located between the second electrically conductive terminal and the second shield layer in the second pad region.

* * * * *